US011426883B2

(12) United States Patent
Takahashi et al.

(10) Patent No.: US 11,426,883 B2
(45) Date of Patent: Aug. 30, 2022

(54) GRIPPING TOOL AND GRIPPING SYSTEM

(71) Applicant: KABUSHIKI KAISHA TOSHIBA, Minato-ku (JP)

(72) Inventors: Hiromasa Takahashi, Minato (JP); Noriyuki Ooba, Yokohama (JP); Shintaro Enami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 211 days.

(21) Appl. No.: 16/822,184

(22) Filed: Mar. 18, 2020

(65) Prior Publication Data

US 2020/0215702 A1 Jul. 9, 2020

Related U.S. Application Data

(63) Continuation of application No. PCT/JP2018/032733, filed on Sep. 4, 2018.

(30) Foreign Application Priority Data

Sep. 27, 2017 (JP) .............................. JP2017-185783

(51) Int. Cl.
*B25J 15/12* (2006.01)
*B25J 15/00* (2006.01)
*B25J 15/06* (2006.01)

(52) U.S. Cl.
CPC ............ *B25J 15/12* (2013.01); *B25J 15/0023* (2013.01); *B25J 15/06* (2013.01)

(58) Field of Classification Search
CPC ........ B25J 15/12; B25J 15/0023; B25J 15/06; B25J 15/0616
See application file for complete search history.

(56) References Cited

U.S. PATENT DOCUMENTS

| 5,617,338 A | 4/1997 | Sugano et al. | |
|---|---|---|---|
| 6,318,181 B1* | 11/2001 | Shimomoto | ............ G01L 15/00 73/709 |
| 6,393,336 B1* | 5/2002 | Kano | .................... G01L 27/007 700/228 |
| 7,175,504 B2* | 2/2007 | Izumi | ..................... B24B 37/11 451/289 |

(Continued)

FOREIGN PATENT DOCUMENTS

| JP | 56-114688 A | 9/1981 |
|---|---|---|
| JP | 5-69997 A | 3/1993 |

(Continued)

*Primary Examiner* — Stephen A Vu (74) *Attorney, Agent, or Firm* — Oblon, McClelland, Maier & Neustadt, L.L.P.

(57) ABSTRACT

According to one embodiment, a gripping tool includes a gripper, a sensor, a pump unit, and a controller. The gripper is flexible and has a granular material provided in an interior of the gripper. The sensor is connected to the interior. The sensor detects a pressure or a flow rate of a gas. The pump unit is connected to the interior. The controller performs at least a first operation of causing the gripper to contact a workpiece and causing the gripper to operate, and a second operation of separating the gripper from the workpiece and causing the gripper to operate. In at least a portion of the second operation, the controller sets a pressure of the interior to be different from a pressure external to the gripper.

18 Claims, 8 Drawing Sheets

(56) References Cited

U.S. PATENT DOCUMENTS

| | | | | |
|---|---|---|---|---|
| 7,450,021 | B1 * | 11/2008 | Gehm | A01J 5/047 119/14.01 |
| 7,457,680 | B2 * | 11/2008 | Akiyama | H01L 21/67775 700/112 |
| 2015/0375404 | A1 | 12/2015 | Matsuoka | |

FOREIGN PATENT DOCUMENTS

| | | |
|---|---|---|
| JP | 2004-103922 A | 4/2004 |
| JP | 2013-86185 A | 5/2013 |
| JP | 2014-159069 A | 9/2014 |
| WO | WO 2015/123128 A1 | 8/2015 |

* cited by examiner

GRIPPING TOOL AND GRIPPING SYSTEM

CROSS-REFERENCE TO RELATED APPLICATIONS

This is a continuation application of International Application PCT/JP2018/032733, filed on Sep. 4, 2018. This application also claims priority to Japanese Patent Application No. 2017-185783, filed on Sep. 27, 2017. The entire contents of each are incorporated herein by reference.

FIELD

Embodiments described herein relate generally to a gripping tool and a gripping system.

BACKGROUND

There is a gripping tool that includes a gripper having a granular material provided in the interior of the gripper. If the gripper of the gripping tool ruptures and the granular material of the interior scatters into the periphery, it is necessary not only to repair the gripping tool but also to clean the periphery of the gripping tool. As a result, the work efficiency decreases greatly.

Therefore, a gripping tool is desirable in which the scattering of the granular material can be suppressed by detecting when the gripper ruptures.

DETAILED DESCRIPTION

According to one embodiment, a gripping tool includes a gripper, a sensor, a pump unit, and a controller. The gripper is flexible and has a granular material provided in an interior of the gripper. The sensor is connected to the interior. The sensor detects a pressure or a flow rate of a gas. The pump unit is connected to the interior. The controller performs at least a first operation of causing the gripper to contact a workpiece and causing the gripper to operate, and a second operation of separating the gripper from the workpiece and causing the gripper to operate. In at least a portion of the second operation, the controller sets a pressure of the interior to be different from a pressure external to the gripper.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Figure 1:
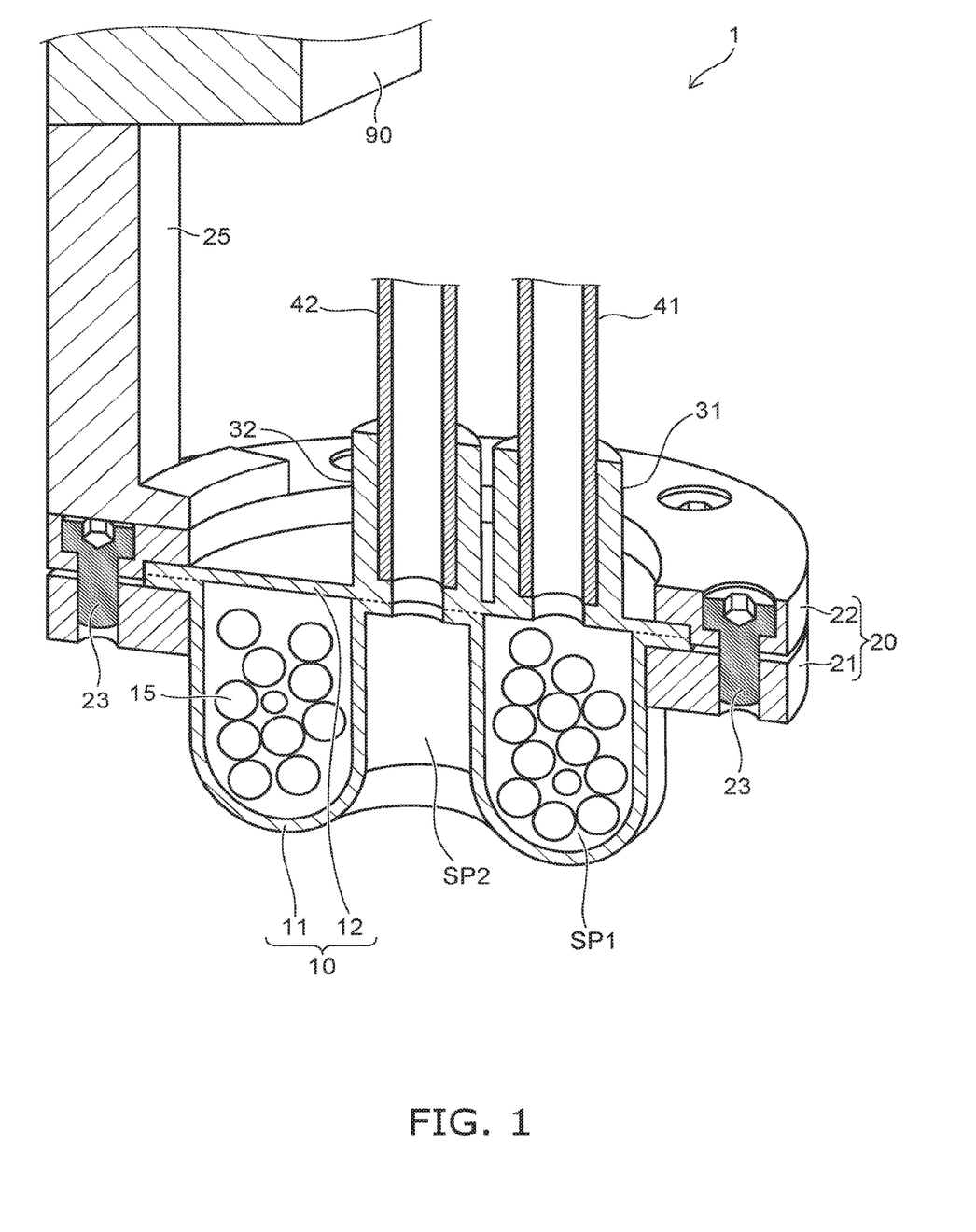
FIG. 1 is a perspective cross-sectional view illustrating a gripping tool according to an embodiment.

FIG. 1 is a perspective cross-sectional view illustrating a gripping tool 1 according to an embodiment.

The gripping tool 1 according to the embodiment includes a gripper 10 that is flexible. A granular material 15 is provided in the interior of the gripper 10.

Specifically, the gripper 10 includes a first portion 11 contacting a workpiece to be gripped, and a second portion 12 opposing the first portion 11. The first portion 11 and the second portion 12 include flexible materials such as a silicone resin, a rubber material, an acrylic resin, etc. The granular material 15 is provided in a first space SP1 between the first portion 11 and the second portion 12. The gripper 10 is configured by, for example, bonding the first portion 11 and the second portion 12 via a bonding agent. The first portion 11 and the second portion 12 may be bonded by thermal compression bonding.

The outer perimeter of the first portion 11 and the outer perimeter of the second portion 12 are held by a holder 20. Thereby, the first space SP1 is separated from an external space. The holder 20 has, for example, a circular ring configuration. Because only the outer perimeter of the gripper 10 is held by the holder 20, the gripper 10 can deform inside the holder 20 in the direction of a line connecting the first portion 11 and the second portion 12.

The direction of the line connecting the first portion 11 and the second portion 12 is, for example, along the vertical direction. The direction of the line connecting the first portion 11 and the second portion 12 includes a first direction (up) from the first portion 11 toward the second portion 12, and a second direction (down) from the second portion 12 toward the first portion 11. Hereinbelow, the description of the embodiments is performed using "vertical direction", "up/above", and "down/below" based on the positional relationship between the first portion 11 and the second portion 12.

As an example, the holder 20 includes a first flange 21 and a second flange 22. The first flange 21 abuts the outer perimeter lower surface of the first portion 11. The second flange 22 abuts the outer perimeter upper surface of the second portion 12. The gripper 10 is held by fastening the first flange 21 and the second flange 22 using a fastener 23 such as a screw, etc.

For example, the holder 20 is coupled to a driver 90 via a coupling member 25. The driver 90 includes an actuator, etc. The driver 90 operates based on a signal transmitted from a controller 80 described below. Also, another member may be coupled between the driver 90 and the coupling member 25. The gripper 10 is moved in the horizontal direction or the vertical direction by operating the driver 90.

Figure 2:
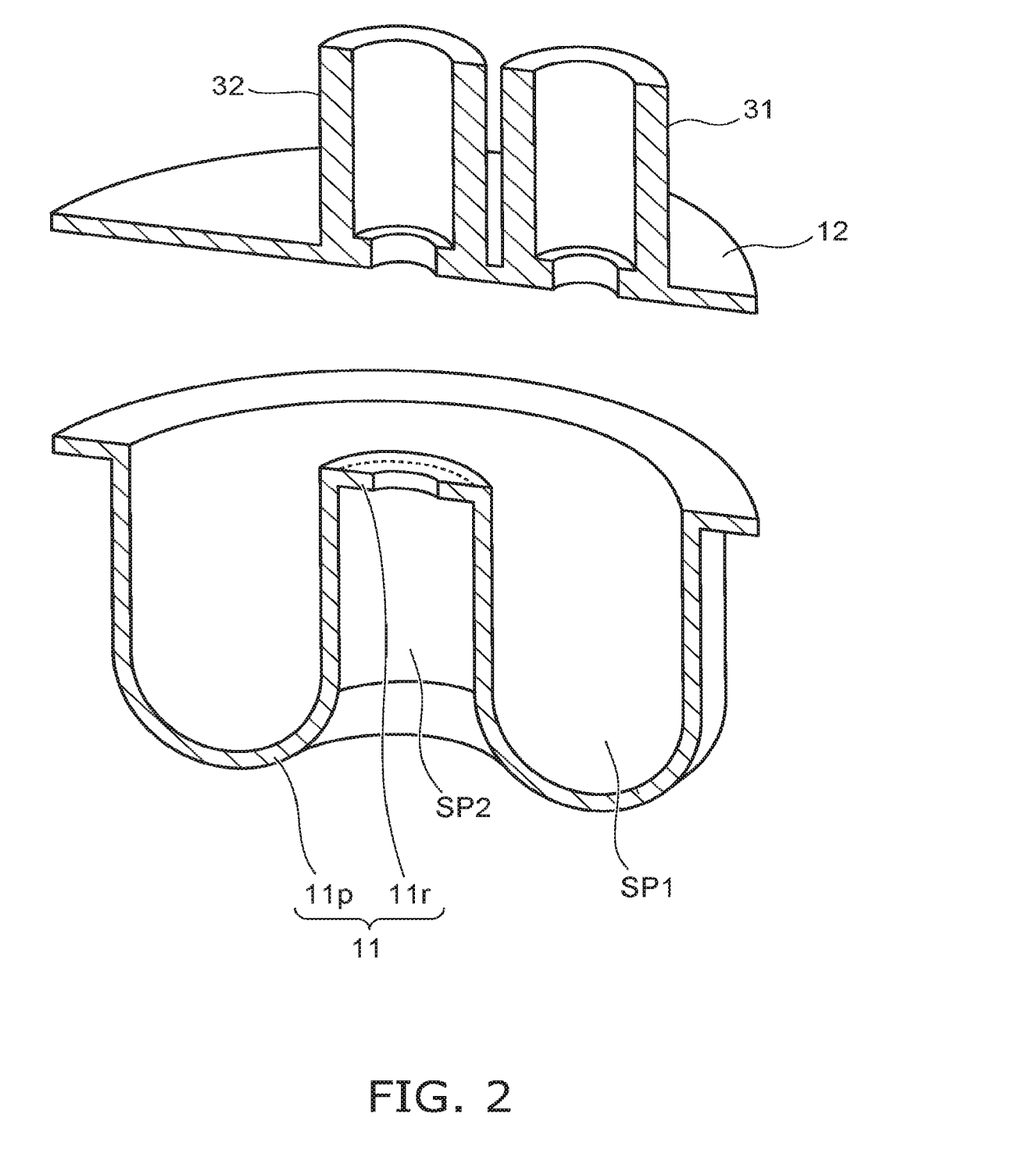
FIG. 2 is a perspective cross-sectional view illustrating the gripper of the gripping tool according to the embodiment.

FIG. 2 is a perspective cross-sectional view illustrating the gripper 10 of the gripping tool 1 according to the embodiment.

The first portion 11 and the second portion 12 of the gripper 10 are illustrated as being separated in FIG. 2.

As illustrated in FIG. 2, the first portion 11 includes a concave portion 11r and a convex portion 11p. The concave portion 11r is recessed upward and is provided at the center of the gripper 10. The convex portion 11p protrudes downward and is provided around the concave portion 11r. The convex portion 11p and the concave portion 11r are continuous with each other.

The upper surface of the concave portion 11r contacts the second portion 12. The convex portion 11p is separated from the second portion 12 in the vertical direction. In the gripping tool 1 illustrated in FIG. 1 and FIG. 2, the first space SP1 is formed between the convex portion 11p and the second portion 12.

A second space SP2 which is surrounded with the concave portion 11r and the convex portion 11p is formed below the first portion 11. Specifically, the top of the second space SP2 is covered with the concave portion 11r. The side of the second space SP2 is surrounded with the convex portion 11p. The bottom of the second space SP2 is open. As described below, the second space SP2 is sealed from the external space by the workpiece to be gripped being positioned below the second space SP2.

As illustrated in FIG. 1 and FIG. 2, the gripper 10 further includes a first port 31 and a second port 32. The first port 31 communicates with the first space SP1. The second port 32 pierces the second portion 12 and the concave portion 11r of the first portion 11 and communicates with the second space SP2. A first pipe 41 for depressurizing the first space SP1 is connected to the first port 31. A second pipe 42 for depressurizing the second space SP2 is connected to the second port 32.

Figure 3:
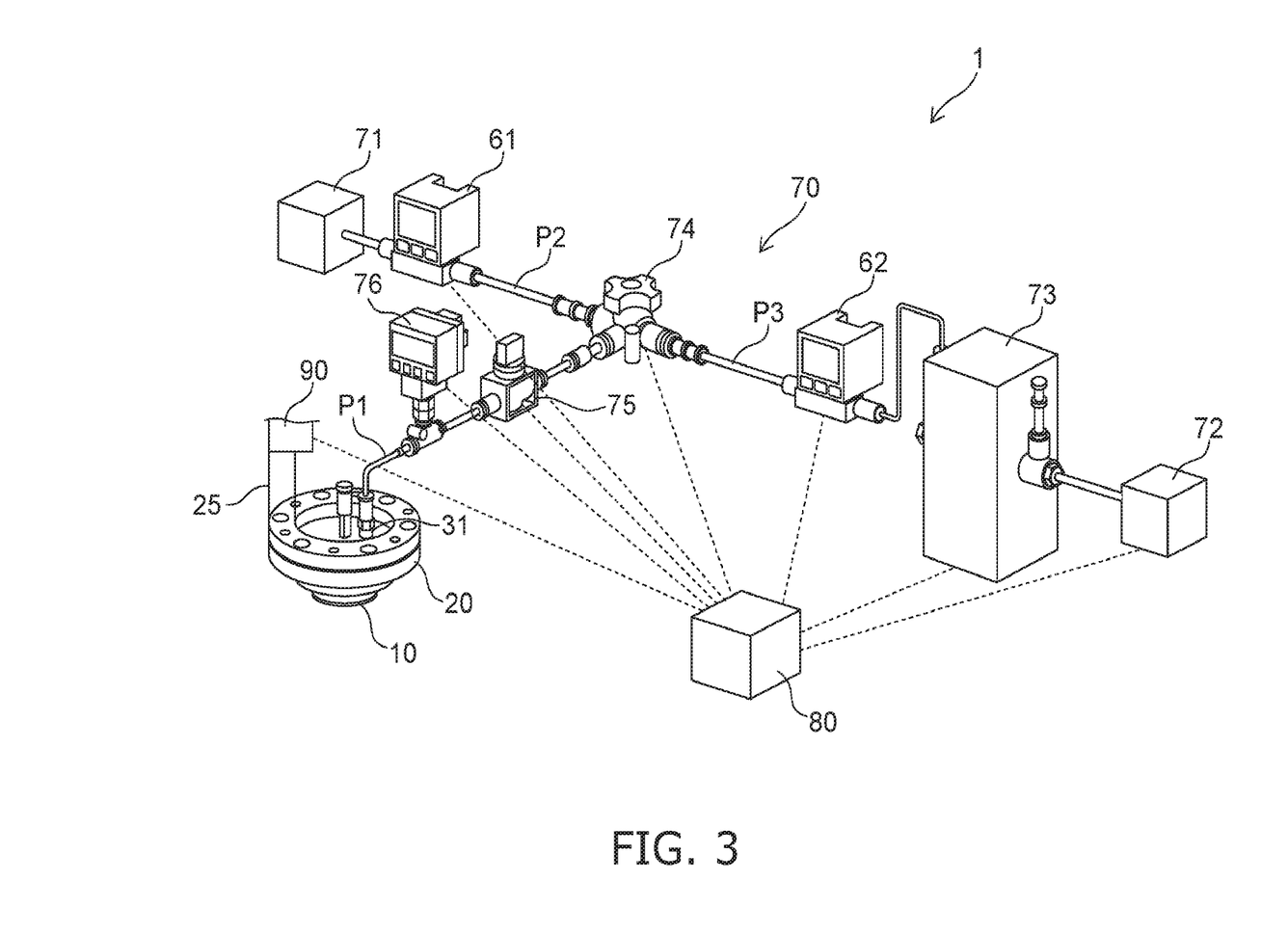
FIG. 3 is a schematic view illustrating the configuration of the gripping tool according to the embodiment.

FIG. 3 is a schematic view illustrating the configuration of the gripping tool 1 according to the embodiment.

The gripping tool 1 further includes a sensor and a pump unit 70. In the example illustrated in FIG. 3, the two sensors of a first sensor 61 and a second sensor 62 are provided as an integral body with the pump unit 70.

The pump unit 70 includes, for example, the first sensor 61, the second sensor 62, a first pump 71, a second pump 72, a pressure regulating valve 73, a switching valve 74, a valve 75, and a pressure gauge 76.

The valve 75 and the pressure gauge 76 are provided on an air passageway P1. At least a portion of the air passageway P1 includes the first pipe 41. The pressure gauge 76 is provided between the first space SP1 and the valve 75. The valve 75 is provided between the switching valve 74 and the pressure gauge 76. For example, the air passageway P1 branches into an air passageway P2 and an air passageway P3 via the switching valve 74.

The first pump 71 is connected to the air passageway P2. The first sensor 61 is provided on the air passageway P2 and is provided between the first pump 71 and the switching valve 74. The second pump 72 is connected to the air passageway P3.

The second sensor 62 and the pressure regulating valve 73 are provided on the air passageway P3. The pressure regulating valve 73 is provided between the second pump 72 and the switching valve 74. The second sensor 62 is provided between the pressure regulating valve 73 and the switching valve 74.

For example, the first pump 71 depressurizes the first space SP1 by suctioning air via the air passageway P1 and the air passageway P2. The first sensor 61 detects the flow rate in the air passageway P2.

For example, the second pump 72 pressurizes the first space SP1 by intaking air from the outside and supplying the air to the air passageway P1 and the air passageway P3. The second sensor 62 detects the flow rate in the air passageway P3. The pressure regulating valve 73 adjusts the pressure applied from the second pump 72.

An electromagnetic flow meter, a Karman vortex flow meter, an impeller flow meter, a rotameter, a thermal flow meter, a diaphragm flow meter, an ultrasonic flow meter, a Coriolis flow meter, etc., can be used as the first sensor 61 and the second sensor 62.

A Bourdon tube pressure gauge, a diaphragm pressure gauge, a bellows pressure gauge, a liquid column pressure gauge, etc., can be used as the pressure gauge 76.

The first sensor 61 and the second sensor 62 may be pressure gauges. In such a case, the first sensor 61 detects the pressure in the air passageway P2. The second sensor 62 detects the pressure in the air passageway P3. Similarly to the pressure gauge 76, a Bourdon tube pressure gauge, a diaphragm pressure gauge, a bellows pressure gauge, or a liquid column pressure gauge can be used as the first sensor 61 and the second sensor 62.

The switching valve 74 includes a solenoid valve, a motorized valve, an electronic flow regulating valve, a constant flow rate valve, etc., which are not illustrated. The air passageway P1 and one of the air passageway P2 or P3 are connected by the switching valve 74. The state in which the first space SP1 is depressurized and the state in which the first space SP1 is pressurized are switched by the switching valve 74. The state in which a gas flows through the air passageway P1 and the state in which a gas does not flow through the air passageway P1 are switched by the opening and closing of the valve 75. The pressure gauge 76 detects the pressure in the air passageway P1.

The operations of the components of the pump unit 70 are controlled by the controller 80. The controller 80 is electrically connected to the first sensor 61, the second sensor 62, the pump unit 70, and the driver 90. The detection results of the first sensor 61, the second sensor 62, and the pressure gauge 76 are transmitted to the controller 80. Based on these detection results, the controller 80 controls the operations of the components of the pump unit 70 and the operation of the driver 90.

FIG. 4A to FIG. 5D are cross-sectional views illustrating the operation of the gripping tool 1 according to the embodiment.

FIG. 4A to FIG. 5D illustrate an example in which a spherical workpiece is gripped by the gripping tool 1. In the gripping tool 1, a first operation illustrated in FIGS. 4A to 4F and a second operation illustrated in FIGS. 5A to 5D are performed by the controller 80. The first operation is performed in the state in which the gripper 10 contacts the workpiece. The second operation is performed in the state in which the gripper 10 is separated from the workpiece.

Figure 4A:
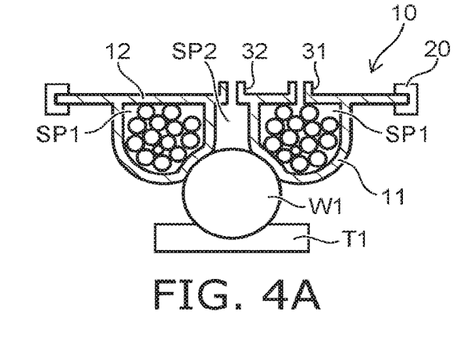
FIG. 4A to FIG. 4F are cross-sectional views illustrating the operation of the gripping tool according to the embodiment.

For example, the gripper 10 is positioned higher than a workpiece W1. First, the position in the horizontal direction of the gripper 10 and the position in the horizontal direction of the workpiece W1 are aligned. Then, the gripper 10 is lowered toward the workpiece W1 placed on a tray T1. As illustrated in FIG. 4A, the gripper 10 (the first portion 11) is caused to contact the workpiece W1. The operation described above until the gripper 10 contacts the workpiece W1 is included in the second operation.

Figure 4B:
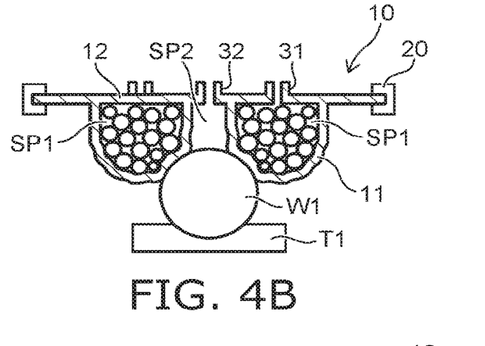

The gripper 10 is flexible. Therefore, the gripper 10 deforms along the shape of the workpiece W1 when the gripper 10 contacts the workpiece W1. At this time, the second space SP2 that was open is sealed by the workpiece W1. Continuing, the first space SP1 is depressurized via the first port 31. For example, the first space SP1 is depressurized to about 0.1 atmosphere. Thereby, the granular material 15 in the first space SP1 jams and solidifies as illustrated in FIG. 4B.

Figure 4C:
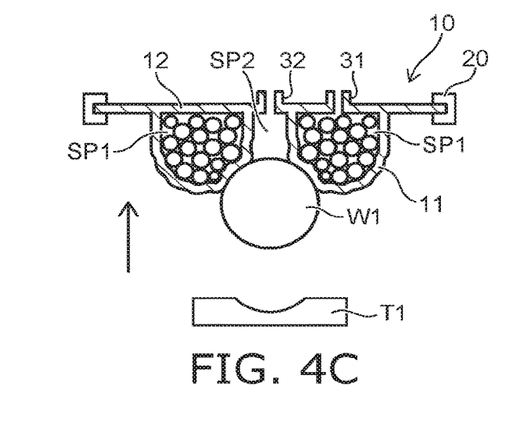

Then, the second space SP2 is depressurized via the second port 32. For example, the second space SP2 is depressurized to about 0.1 atmosphere. Thereby, the workpiece W1 is suctioned toward the second space SP2; and the workpiece W1 is gripped. As illustrated in FIG. 4C, the gripper 10 is raised; and the workpiece W1 is lifted from the tray T1.

Figure 4D:
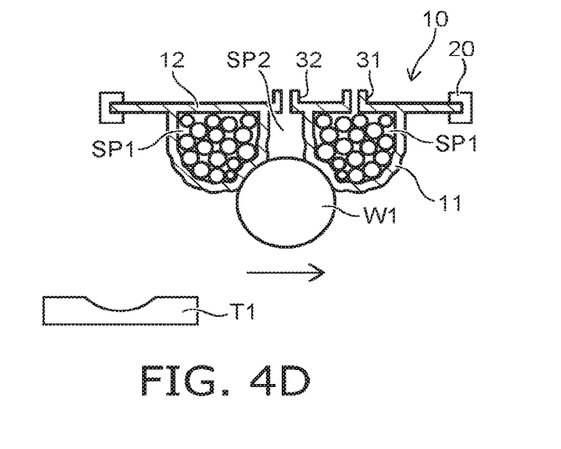
Figure 4E:
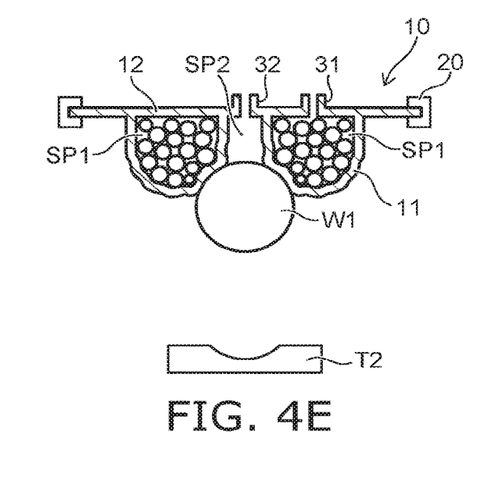
Figure 4F:
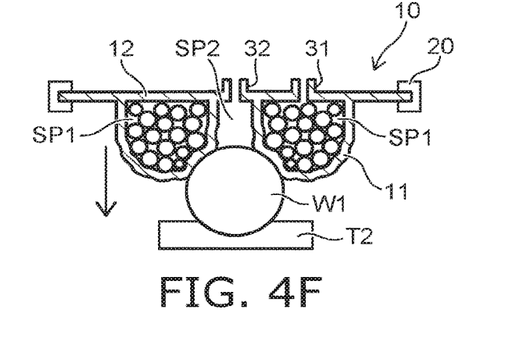

For example, as illustrated in FIG. 4D, the gripper 10 is moved in the horizontal direction. As illustrated in FIG. 4E, the position in the horizontal direction of the gripper 10 and the position in the horizontal direction of the location to which the workpiece W1 is to be transferred are aligned. In the example, the workpiece W1 is transferred above another tray T2. As illustrated in FIG. 4F, the gripper 10 is lowered; and the workpiece W1 is caused to contact the tray T2 from above. Subsequently, the gripping force is eliminated by opening the first space SP1 and the second space SP2 to the atmosphere. Thereby, the workpiece W1 is released from the gripper 10; and the workpiece W1 is placed on the tray T2.

Figure 5A:
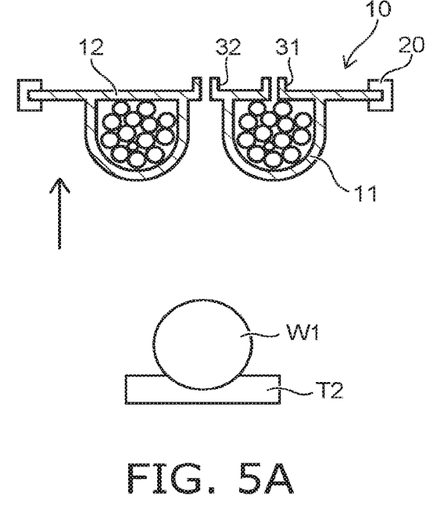
FIG. 5A to FIG. 5D are cross-sectional views illustrating the operation of the gripping tool according to the embodiment.
Figure 5B:
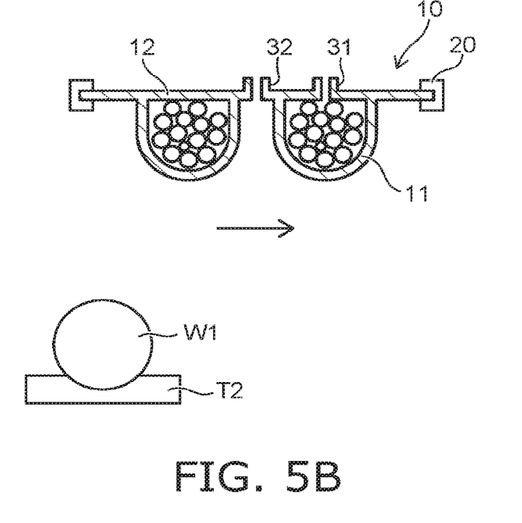
Figure 5C:
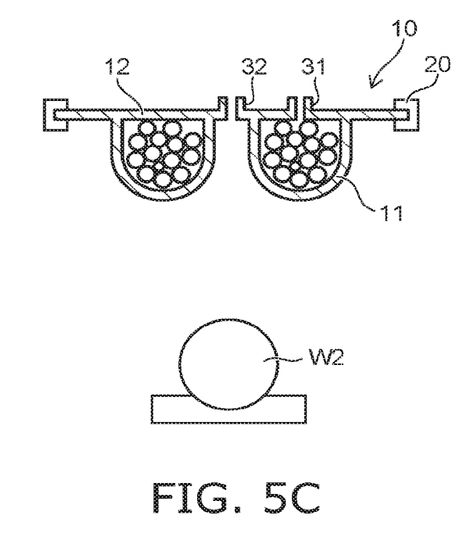
Figure 5D:
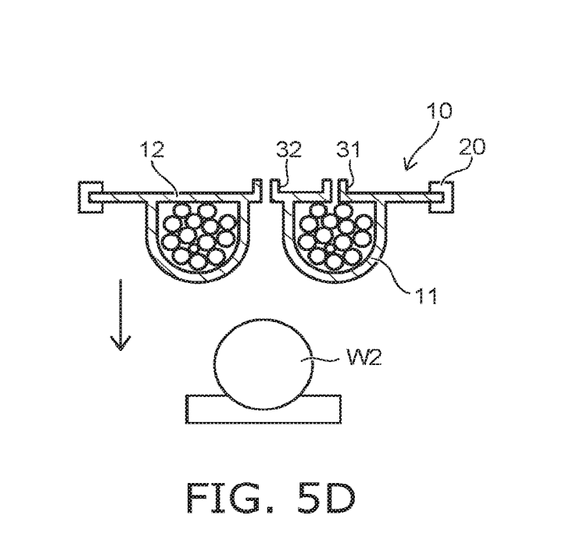

After placing the workpiece W1 on the tray T2, the second operation is started. First, as illustrated in FIG. 5A, the gripper 10 is raised to move away from the workpiece W1 (a first movement operation). Then, as illustrated in FIG. 5B, the gripper 10 is moved (a second movement operation). For example, in the second movement operation, the gripper 10 moves toward another workpiece W2. In the second movement operation, for example, the movement direction of the gripper 10 is a direction crossing the movement direction of the gripper 10 in the first movement operation. Continuing as illustrated in FIG. 5C, the gripper 10 and the workpiece W2 are aligned. When the alignment is completed, the gripper 10 is caused to approach the workpiece W2 as illustrated in FIG. 5D (a third movement operation).

Subsequently, the first operation illustrated in FIG. 4A to FIG. 4F is performed similarly; and the workpiece W2 is transferred.

The controller 80 drives the pump unit 70 to set the pressure of the first space SP1 of the gripper 10 interior (hereinbelow, called the internal pressure) to be different from the pressure external to the gripper 10 (hereinbelow, called the external pressure) in at least a portion of the second operation described above.

For example, the controller 80 sets the internal pressure to be lower than the external pressure in at least a portion of the second operation. In such a case, the gripper 10 interior may be opened to the atmosphere when the gripper 10 contacts another workpiece. Thereby, the gripper 10 easily deforms along the shape of the workpiece.

Or, the controller 80 sets the internal pressure to be higher than the external pressure in at least a portion of the second operation. For example, after transferring the workpiece to the prescribed position, the internal pressure may be increased from the state in which the gripper 10 is depressurized; and the internal pressure may be higher than the external pressure as the workpiece is released from the gripper 10.

Figure 6A:
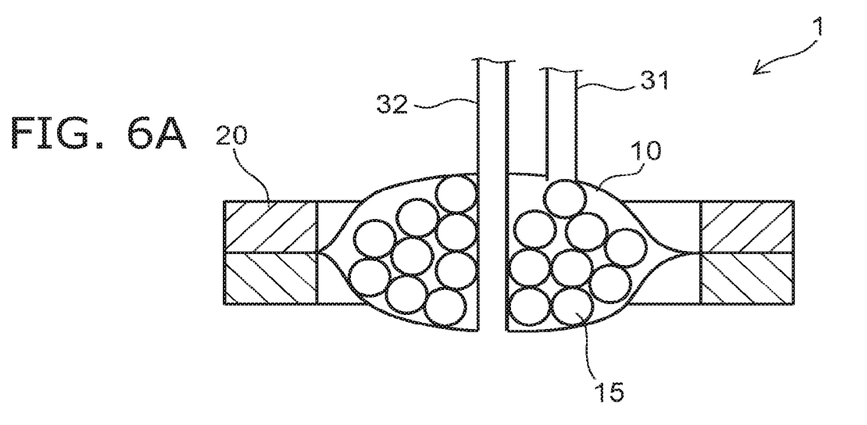
FIGS. 6A to 6C are cross-sectional views illustrating the gripping mechanism of the gripping tool according to the embodiment.
Figure 6B:
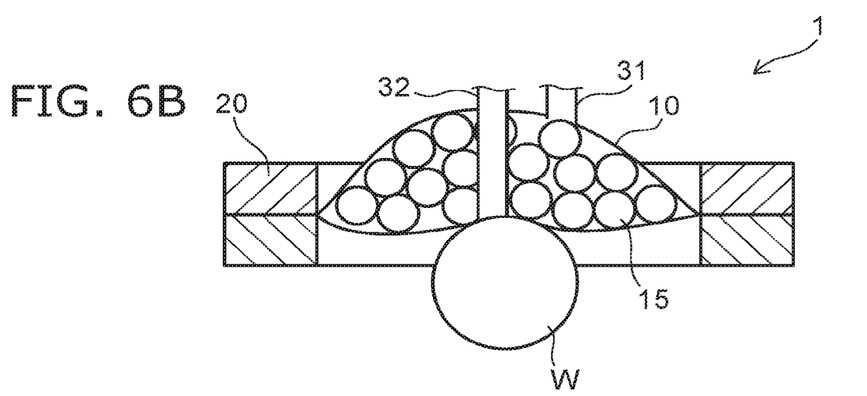
Figure 6C:
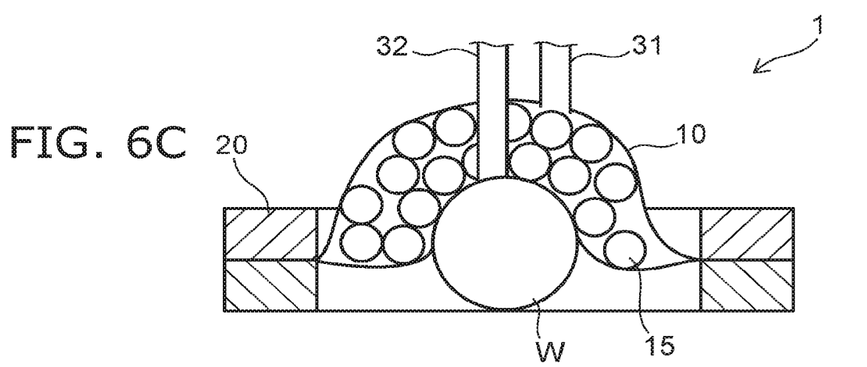

FIGS. 6A to 6C are cross-sectional views illustrating the gripping mechanism of the gripping tool 1 according to the embodiment.

The gripper 10 of the gripping tool 1 is partially simplified in FIGS. 6A to 6C.

In the gripping tool 1 according to the embodiment as illustrated in FIG. 6A, the outer perimeter of the gripper 10 is held by the holder 20. Accordingly, as illustrated in FIG. 6B, the gripper 10 can deform upward with respect to the workpiece W when the gripper 10 is caused to contact the workpiece W.

Air is suctioned via the first port 31 and the second port 32 in this state. As illustrated in FIG. 6C, the contact area between the gripper 10 and the workpiece W increases as the gripper 10 deforms further upward with respect to the workpiece W.

Thus, the gripping force when the workpiece W is gripped by the gripper 10 can be increased by the gripper 10 being held to be deformable upward with respect to the workpiece W.

Effects of the embodiment will now be described.

When the gripper 10 grips the workpiece, there is a possibility that the gripper 10 may be damaged due to friction between the gripper 10 and the workpiece, an unevenness of the workpiece surface, etc. The granular material 15 in the gripper 10 interior scatters if the gripper 10 is damaged and ruptured. As a result, in addition to repairing the gripper 10, it is necessary to clean the scattered granular material 15, etc.; and the work efficiency decreases.

Even if the gripper 10 ruptures, the outflow of the granular material 15 from the gripper 10 is suppressed by the workpiece in the state in which the gripper 10 contacts the workpiece. Conversely, if the gripper 10 ruptures in the state in which the gripper 10 is separated from the workpiece, there is a possibility that more of the granular material 15 may outflow from the gripper 10 and scatter.

In the gripping tool 1 according to the embodiment, sensors such as the first sensor 61, the second sensor 62, etc., are connected to the first space SP1. The controller 80 sets the internal pressure to be different from the external pressure in at least a portion of the second operation. The pressure or the flow rate the first space SP1 and the air passageway P1 changes when the gripper 10 ruptures, a hole is formed, or an abnormality occurs in the second operation. Accordingly, because the pressure or the flow rate is detected by the sensor, the abnormality of the gripper 10 can be detected. By detecting the abnormality of the gripper 10 in the second operation, for example, the rupture and/or the hole of the gripper 10 can be sealed more quickly; and the scattering of the granular material 15 can be suppressed.

As long as the internal pressure is different from the external pressure, the internal pressure may be higher or lower than the external pressure. Even when the internal pressure is higher than the external pressure, as described above, the scattering of the granular material 15 can be suppressed by detecting the abnormality of the gripper 10. If an abnormality occurs in the gripper 10 when the internal pressure is higher than the external pressure, the gas flows externally from the interior of the gripper 10. There is a possibility that the flow of the gas temporarily may promote the outflow of the granular material 15.

Conversely, if an abnormality occurs in the gripper 10 when the internal pressure is lower than the external pressure, the gas flows from the outside into the interior of the gripper 10. The outflow of the granular material 15 is suppressed by such a flow of the gas. Accordingly, it is desirable for the internal pressure to be lower than the external pressure in at least a portion of the second operation.

It is sufficient for the sensor to detect one of the pressure or the flow rate. More favorably, the sensor is a flow meter. This is because the change of the flow rate can be detected with higher accuracy than the change of the pressure. Accordingly, the abnormality of the gripper 10 can be detected with higher accuracy even when the difference between the internal pressure and the external pressure is small.

The controller 80 compares the pressure or the flow rate detected by the sensor to a preset threshold.

For example, when the sensor is a pressure gauge and the gripper 10 interior is pressurized in at least a portion of the second operation, the controller 80 determines that an abnormality has occurred in the gripper 10 when the detected pressure falls below the threshold. If the gripper 10 interior is depressurized in the second operation, the controller 80 determines that an abnormality has occurred in the gripper 10 when the detected pressure exceeds the threshold.

Or, when the sensor is a flow meter, the controller 80 determines that an abnormality has occurred in the gripper 10 when the detected flow rate exceeds a threshold.

The controller 80 may compare the change of the pressure or the change of the flow rate to a preset threshold. For example, the change of the pressure or the flow rate in a prescribed period is compared to a preset threshold. It is determined that an abnormality has occurred in the gripper 10 when the change of the pressure or the flow rate exceeds the threshold.

The threshold may be set based on previous detection results of the sensor. For example, a prescribed value added to the average value of the pressure or the flow rate in some period may be used as the threshold. According to this method, the abnormality of the gripper 10 can be detected with higher accuracy because the threshold changes according to the change of the characteristics of the gripper 10 and/or the pump unit 70 as time elapses.

When an abnormality occurs in the gripper 10, for example, the controller 80 causes the gripper 10 to stop. By stopping the gripper 10, the outflow of the granular material 15 from the gripper 10 can be suppressed.

Or, the controller 80 moves the gripper 10 to a prescribed position. For example, the scattering of the granular material 15 to the floor of the work site, equipment, etc., can be suppressed by moving the gripper 10 to a location where a tray or the like receiving the granular material 15 is provided.

Or, the controller 80 emits a notification to a manager of the gripping tool 1, etc. Due to the notification, the manager can know more quickly that the abnormality occurred in the gripper 10. The controller 80 may emit the notification and stop or move the gripper 10 as recited above.

Figure 7:
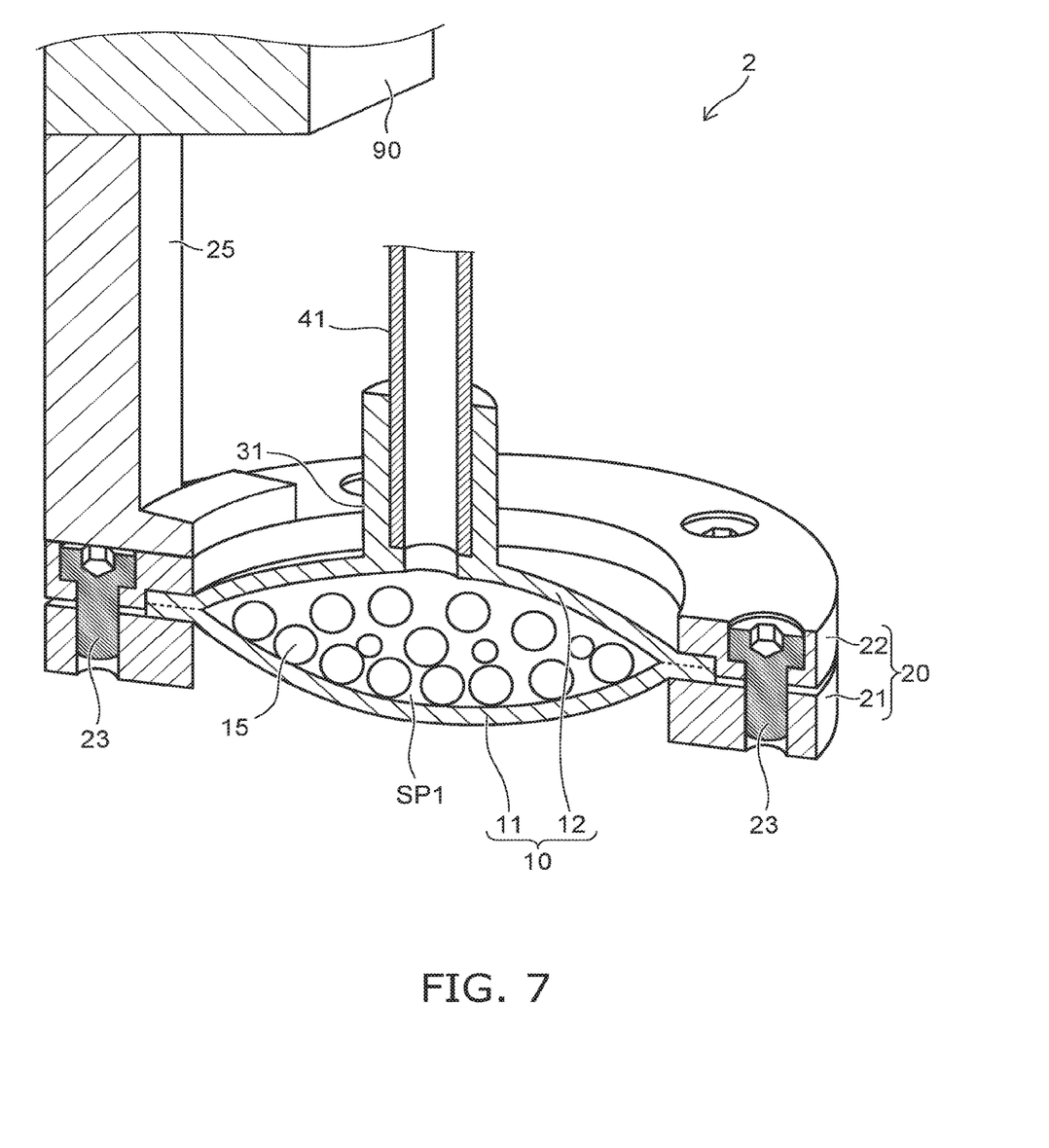
FIG. 7 is a perspective cross-sectional view illustrating a gripping tool according to a modification of the embodiment.

FIG. 7 is a perspective cross-sectional view illustrating a gripping tool 2 according to a modification of the embodiment.

Compared to the gripping tool 1, the configuration of the gripper 10 of the gripping tool 2 is different. The gripping tool 2 does not include the second port 32. Therefore, the gripping tool 2 grips the workpiece by causing the gripper 10 to contact the workpiece and by solidifying the gripper 10.

In the gripping tool 2 as well, similarly to the gripping tool 1, the abnormality of the gripper 10 in the second operation can be detected by setting the internal pressure to be different from the external pressure in the second operation.

Thus, as long as the granular material 15 is provided in the gripper 10 interior, the embodiment is applicable also to other gripping tools having configurations different from that of the gripping tool illustrated in FIG. 1 and FIG. 2.

Figure 8:
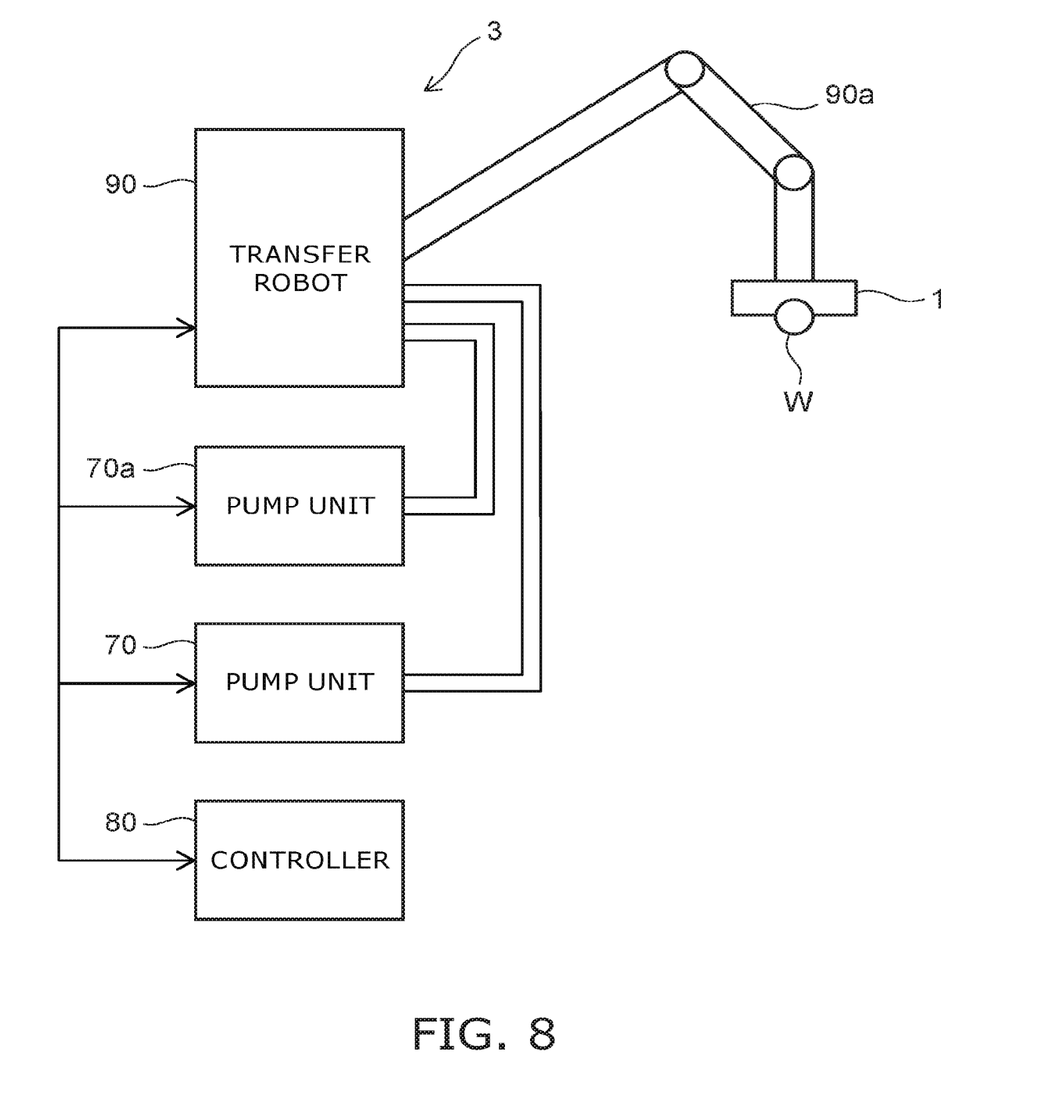
FIG. 8 is a schematic view illustrating a gripping system according to the embodiment.

FIG. 8 is a schematic view illustrating a gripping system 3 according to the embodiment.

The gripping system 3 according to the embodiment includes the gripping tool 1, the pump unit 70, a pump unit 70a, the controller 80, and a transfer robot (the driver) 90.

The transfer robot 90 includes an arm 90a. The arm 90a includes, for example, multiple joints. The gripping tool 1 is mounted to the tip of the arm 90a. The transfer robot 90 operates the arm 90a, grips the workpiece W, and transfers the workpiece W according to commands from the controller 80.

The pump unit 70 is connected to the first pipe 41 of the gripping tool 1 illustrated in FIG. 1. The pump unit 70a is connected to the second pipe 42 of the gripping tool 1. The first space SP1 and the second space SP2 are depressurized and opened to the atmosphere by driving the pump units 70 and 70a according to the commands from the controller 80.

The controller 80 includes a CPU (Central Processing Unit), ROM (Read Only Memory), nonvolatile flash memory, etc. Various calculation processing of the controller 80 is performed in the CPU. Various control algorithms, various constants, etc., necessary for the operation of the gripping system 3 are stored in the ROM. The transfer procedure of the workpiece W, the transfer conditions, etc., are appropriately stored and saved in the flash memory.

The controller 80 controls the operations of the pump unit 70, the pump unit 70a, and the transfer robot 90 by sending commands to the pump unit 70, the pump unit 70a, and the transfer robot 90 according to the transfer procedure stored in the flash memory.

By including the gripping tool 1 having a high gripping performance, the gripping system 3 can more reliably grip and transfer the workpiece W. The gripping system 3 may include the gripping tool 2 instead of the gripping tool 1. The gripping system 3 may not include the pump unit 70a when the gripping system 3 includes the gripping tool 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A gripping tool, comprising:
   a gripper, the gripper being flexible and including a granular material provided in an interior of the gripper;
   a sensor connected to the interior, the sensor detecting a pressure or a flow rate of a gas;
   a pump unit connected to the interior; and
   a controller,
   the controller performing at least
      a first operation of causing the gripper to contact a workpiece and causing the gripper to operate, and
      a second operation of separating the gripper from the workpiece and causing the gripper to operate,
   in at least a portion of the second operation, the controller setting a pressure of the interior to be different from a pressure external to the gripper by driving the pump unit;
   wherein the gripper includes:
      a first portion configured to contact the workpiece,
      a second portion opposed to the first portion, and
      a granular material provided between the first portion and the second portion, and the first portion and the second portion are deformable along a line direction connecting the first portion and the second portion;

wherein the first portion includes:
a concave portion recessed in a first direction from the first portion to the second portion, and
a convex portion provided around the concave portion and protruding in a second direction being the reverse of the first direction, the granular material is provided between the concave portion and the second portion; and further comprising a first port communicating with a first space between the first portion and the second portion, the first port being configured to be connected to a first pipe for depressurizing the first space, and a second port communicating with a second space surrounded with the concave portion and the convex portion, the second port being configured to be connected to a second pipe for depressurizing the second space.

2. The tool according to claim 1, wherein
the second port includes a penetrating portion penetrating the second portion and the concave portion,
a first dimension in one direction of the concave portion is longer than a second dimension in the one direction of the penetrating portion, and
the one direction is perpendicular to the first direction.

3. The tool according to claim 1, further comprising:
a holder holding an outer perimeter of the first portion and an outer perimeter of the second portion,
the second portion being more deformable, in a first direction, than the outer perimeter of the second portion held by the holder,
the first direction being from the first portion to the second portion.

4. The tool according to claim 1, wherein in the first operation, the controller depressurizes the interior by driving the pump unit in a state that the gripper contacts the workpiece and jams the granular material so that the gripper grips the workpiece.

5. The tool according to claim 1, wherein in at least the portion of the second operation, the controller drives the pump unit to set the pressure of the interior to be lower than the external pressure within a range where the granular material does not jam.

6. The tool according to claim 1, wherein the sensor detects a flow rate of a gas.

7. The tool according to claim 6, wherein the controller causes the gripper to stop when the flow rate exceeds a threshold.

8. The tool according to claim 6, wherein the controller emits a notification when the flow rate exceeds a threshold.

9. The tool according to claim 1, wherein the first operation includes at least one of gripping the workpiece, transferring the workpiece, or releasing the workpiece.

10. A gripping system, comprising:
a robot mechanism including an arm; and
the gripping tool according to claim 1 mounted to a tip of the arm.

11. A gripping tool, comprising:
a gripper, the gripper being flexible and including a granular material provided in an interior of the gripper;
a sensor connected to the interior, the sensor detecting a pressure or a flow rate of a gas;
a pump unit connected to the interior; and
a controller,
the controller performing at least
a first operation of causing the gripper to contact a workpiece and causing the gripper to operate, and
a second operation of separating the gripper from the workpiece and causing the gripper to operate,
in at least a portion of the second operation, the controller setting a pressure of the interior to be different from a pressure external to the gripper by driving the pump unit,
wherein in the first operation, the controller depressurizes the interior by driving the pump unit in a state that the gripper contacts the workpiece and jams the granular material so that the gripper grips the workpiece, and
wherein in the first operation, when a transfer of the workpiece is completed, the controller increases the pressure of the interior by driving the pump unit to ease the jam of the granular material, and
in at least the portion of the second operation after easing the jam of the granular material, the controller sets the pressure of the interior to be lower than the external pressure by driving the pump unit.

12. A gripping tool, comprising:
a gripper, the gripper being flexible and including a granular material provided in an interior of the gripper;
a sensor connected to the interior, the sensor detecting a pressure or a flow rate of a gas;
a pump unit connected to the interior; and
a controller,
the controller performing at least
a first operation of causing the gripper to contact a workpiece and causing the gripper to operate, and
a second operation of separating the gripper from the workpiece and causing the gripper to operate,
in at least a portion of the second operation, the controller setting a pressure of the interior to be different from a pressure external to the gripper by driving the pump unit,
wherein the sensor detects a flow rate of a gas, and
wherein the controller moves the gripper to a prescribed location when the flow rate exceeds a threshold.

13. A gripping tool, comprising:
a gripper, the gripper being flexible and including a granular material provided in an interior of the gripper;
a sensor connected to the interior, the sensor detecting a pressure or a flow rate of a gas;
a pump unit connected to the interior; and
a controller,
the controller performing at least
a first operation of causing the gripper to contact a workpiece and causing the gripper to operate, and
a second operation of separating the gripper from the workpiece and causing the gripper to operate,
in at least a portion of the second operation, the controller setting a pressure of the interior to be different from a pressure external to the gripper by driving the pump unit,
wherein the second operation includes at least one of:
a first movement operation of causing the gripper to move away from the workpiece;
a second movement operation of moving the gripper in a direction crossing a movement direction of the gripper in the first movement operation; or
a third movement operation of causing the gripper to approach the workpiece.

14. A control method for controlling a gripping tool, the tool including:

a gripper, the gripper being flexible and including a granular material provided in an interior of the gripper, a sensor connected to the interior, the sensor detecting a pressure or a flow rate of a gas, and a pump unit connected to the interior, the method comprising:

a first operation of causing the gripper to contact a workpiece and causing the gripper to operate; and a second operation of separating the gripper from the workpiece and causing the gripper to operate, in at least a portion of the second operation, the controller setting a pressure of the interior to be different from a pressure external to the gripper by driving the pump unit, wherein in the first operation, the interior is depressurized by driving the pump unit in a state that the gripper contacts the workpiece and the granular material is jammed so that the gripper grips the workpiece, and wherein in the first operation, when a transfer of the workpiece is completed, the pressure of the interior is increased by driving the pump unit to ease the jam of the granular material, and in at least the portion of the second operation after easing the jam of the granular material, the pressure of the internal is set to be lower than the external pressure by driving the pump unit.

15. The method according to claim 14, wherein the gripper includes:

a first portion configured to contact the workpiece, a second portion opposed to the first portion, and a granular material provided between the first portion and the second portion, and the first portion and the second portion are deformable along a line direction connecting the first portion and the second portion.

16. The method according to claim 15, wherein the tool further includes a holder holding an outer perimeter of the first portion and an outer perimeter of the second portion, the second portion being more deformable, in a first direction, than the outer perimeter of the second portion held by the holder, the first direction being from the first portion to the second portion.

17. The method according to claim 14, wherein the sensor detects a flow rate of a gas.

18. A control method for controlling a gripping tool, the tool including:

a gripper, the gripper being flexible and including a granular material provided in an interior of the gripper, a sensor connected to the interior, the sensor detecting a pressure or a flow rate of a gas, and a pump unit connected to the interior, the method comprising:

a first operation of causing the gripper to contact a workpiece and causing the gripper to operate; and a second operation of separating the gripper from the workpiece and causing the gripper to operate, in at least a portion of the second operation, the controller setting a pressure of the interior to be different from a pressure external to the gripper by driving the pump unit, wherein in at least the portion of the second operation, the pump unit is driven to set the pressure of the interior to be lower than the external pressure within a range where the granular material does not jam.

* * * * *